United States Patent Office 3,390,946
Patented July 2, 1968

3,390,946
MIXTURES OF ANTHRAQUINONE DYESTUFFS
Alfred Staub, Binningen, Basel-Land, and Peter Hindermann, Battmingen, Basel-Land, Switzerland, assignors to J. R. Geigy A.G., Basel, Switzerland
No Drawing. Application Nov. 16, 1964, Ser. No. 411,637, which is a continuation-in-part of application Ser. No. 321,364, Nov. 4, 1963. Divided and this application July 25, 1966, Ser. No. 591,045
Claims priority, application Switzerland, Nov. 6, 1962, 12,953/62; Oct. 18, 1963, 12,749/63; Nov. 18, 1963, 14,082/63
10 Claims. (Cl. 8—25)

ABSTRACT OF THE DISCLOSURE

Mixtures of a dyestuff of the formula

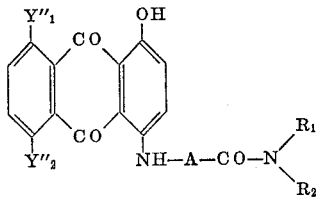

with another dyestuff of the same formula, or with a dyestuff of the formula

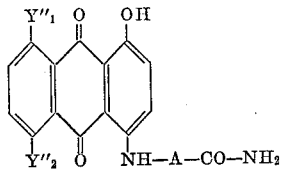

and mixtures of a dyestuff of the formula

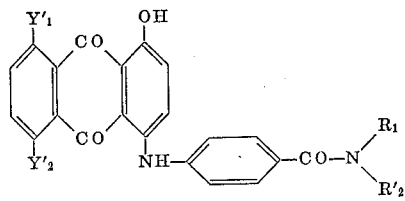

with a dyestuff of the formula

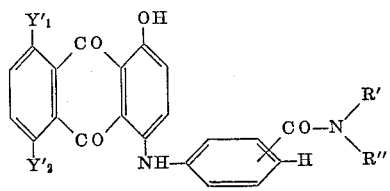

with or without a dyestuff of the formula

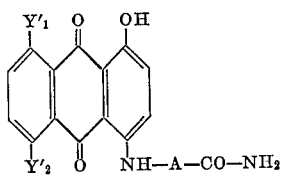

and mixtures of two dyestuffs of the formula

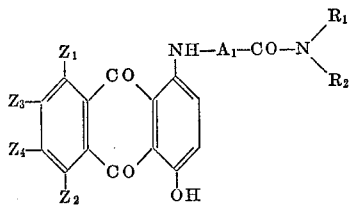

in hereinafter-specified molar proportions, are of enhanced drawing power, especially onto polyester fibers of the terephthalate ester type. The substituents are hereinafter defined.

---

This application is a division of copending application Ser. No. 411,637, filed Nov. 16, 1964, which in turn is a continuation-in-part of our pending application Ser. No. 321,364 filed Nov. 4, 1963 now abandoned.

The aforesaid application Ser. No. 411,637 concerns new anthraquinone dyestuffs, processes for the production thereof, their use for the dyeing of organic hydrophobic fibers, especially polyester fibers of the polyterephthalate type, as well as, as industrial products, the fiber materials dyed with the aid of these dyestuffs in fast, predominantly blue shades.

According to a second aspect, the aforesaid application Ser. No. 411,637 concerns new substituted $\alpha$-phenylaminoanthraquinone dyestuffs, processes for their production, processes for the dyeing of fibers of polymeric esters, particularly of the fibers of polymeric esters of aromatic polycarboxylic acids with polyvalent alcohols using the new dyestuffs and, as industrial products, the fibers dyed with the aid of these dyestuffs, which new dyestuffs are distinguished mainly by the fact that they afford dyeings on the said polyester materials which are predominantly violet shades.

The present invention concerns new dyestuff mixtures for the dyeing of organic polyester materials, especially of the aforesaid type as well as the dye liquors used for the dyeing of this material.

In general, polyester materials have only a slight affinity to dyestuffs. Most of the dyestuffs developed for cellulose acetate draw badly onto polyglycol terephthalate materials or produce dyeings having insufficient fastness to sublimation. Thus, the condensation products of 4,8-di-nitro-1,5-dihydroxy-anthraquinone or of 4,5-dinitro - 1,8 - di-hydroxy-anthraquinone and o-, m- or p-aminobenzamide, even when carriers are used, draw insufficiently onto polyglycol terephthalate. In particular, these dyestuffs are not suitable for cheese dyeings by the high temperature process at temperatures of over 100° C. under pressure as, under these conditions, aqueous dispersions are unstable and produce uneven cheese dyeings. The condensation products mentioned also draw badly onto cellulose di- to tri-acetate material and only produce weak, unusable dyeings.

It has been found that anthraquinone dyestuffs of the formula

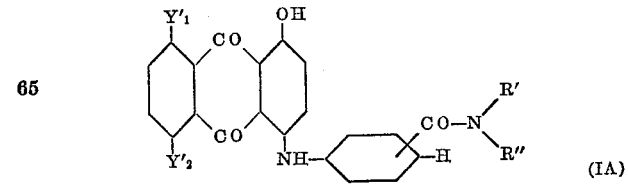

(IA)

and

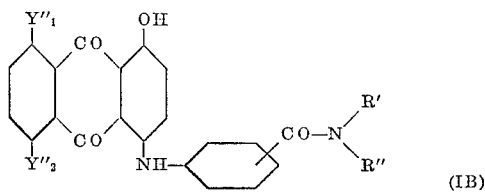

wherein one of $Y'_1$ and $Y'_2$ represents the nitro and the other is the hydroxyl group, one of $Y''_1$ and $Y''_2$ represents the amino or a lower alkyl-amino or hydroxy-lower alkylamino group and the other is the hydroxyl group, R' represents a lower alkyl, lower alkenyl or hydroxy-lower alkyl group, R'' represents a lower alkyl, lower alkenyl or a hydroxy-lower alkyl group, and R' and R'' taken together represent together with the nitrogen atom to which they are bound, a heterocyclic ring which is a pyrrolidyl, piperidyl or morpholyl radical, which dyestuffs are difficultly soluble in water, have outstanding drawing power and are therefore particularly well suited for the dyeing of organic hydrophobic fibers from an aqueous dispersion, and especially for the dyeing of high molecular esters, in particular for the dyeing of esters of aromatic polycarboxylic acids with polyfunctional alcohols such as polyglycol terephthalates such as Terylene, Dacron, Tergal, Trevira, Terital or Kodel.

The dyestuffs can also be used for the dyeing of synthetic polyamide fibers such as "Nylon" or Perlon as well as for the dyeing of laquers and spinning masses.

Polyester fibers are dyed with aqueous dispersions of the dyestuffs of Formulas IA and IB preferably at temperatures of over 100° under pressure. Very good dyeings are also obtained if polyester fibers are impregnated with concentrated aqueous dispersions of dyestuffs the fabric is squeezed out and the dyeing is then fixed at temperatures of 180–250°. The dyeing can also be performed, however, at the boiling point of the water in the presence of carriers such as phenylphenol, polychlorobenzene compounds or similar auxiliaries.

The drawing power of these dyestuffs of Formulas IA and IB on polyester fibers of the terephthalate ester type is especially unexpectedly several times greater than that of the corresponding structurally related anthraquinone derivatives which contain as substituent the group —CO—NH$_2$ instead of the group —CO—NR$_1$R$_2$ of the compounds of the instant invention, and better than those compounds which correspond to Formula IA but have the last mentioned substituent in p-position to the linking —NH-bridge to the anthraquinonyl nucleus.

In the pure state, the new dyestuffs are glittering crystalline, deeply coloured substances. They dissolve in hot organic solvents with a pure blue shade.

The blue dyeings attained on polyester fibers have very good wet, sublimation and light fastness properties. In comparison with similar known compounds the new dyestuffs have the advantage of better drawing power onto polyester fibers.

In this connection, the compounds of Formula IA in which R' and R'' are each a methyl group, are particularly valuable.

"Lower" when used in this specification and in the appended claims in connection with an aliphatic radical means a radical of not more than 4 carbon atoms. In the case of "lower alkenyl" and "hydroxy-lower alkyl" it means radicals with from 3 to 4 and 2 to 4 carbon atoms, respectively.

The drawing power of these dyestuffs can be further improved by mixing two or more of the anthraquinone dyestuffs as defined in Formulas IA and IB or by mixing at least one dyestuff with an anthraquinone dyestuff of similar structure; molar ratios in the mixtures range from 3:1 to 1:3, a molar ratio of about 1:1 being preferred.

Dyestuffs of similar structure as those of Formulas IA and IB which yield in mixture with the latter dyestuffs dye preparations of satisfactory drawing power on polyester fibers, whereas they fail when used alone, all fall under the formula

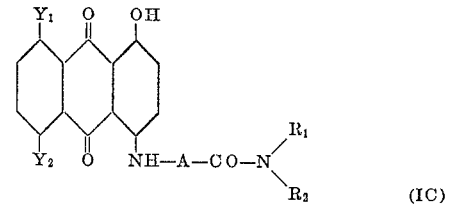

wherein of $Y_1$ and $Y_2$, one Y is the hydroxyl group, the other Y is the nitro, amino, a lower alkylamino or hydroxy-lower alkylamino group, A represents a phenylene radical which may contain substituents which do not dissociate acid in water, but is preferably not substituted, apart from the carbamyl radical, R$_1$ represents lower alkyl, lower alkenyl or hydroxy-lower alkyl, and R$_2$ represents lower alkyl, lower alkenyl or hydroxy-lower alkyl, or R$_1$ and R$_2$ together with the nitrogen atom to which they are bound represent the radical of a five- or six-membered ring, in particular pyrrolidyl, piperidyl or morpholyl; and in those compounds in which one of $Y_1$ and $Y_2$ is nitro and the radical —CO—NR$_1$R$_2$ is in p-position to the —NH-bridge at ring A, R$_2$ has at least 2 carbon atoms.

Other mixtures according to the invention with particularly good drawing power, from aqueous dispersions, on polyester fibers of the type described, are the mixtures which contain preferably in molar ratios of about 3:1 to 1:3, a first dyestuff of the formula

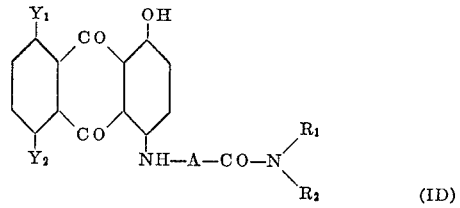

wherein A, $Y_1$, $Y_2$, $R_1$ and $R_2$ have the meanings given hereinbefore, in connection with Formula IC, and a second dyestuff of the formula

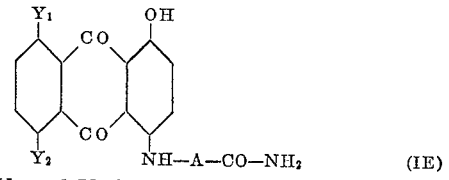

wherein A, $Y_1$ and $Y_2$ have the meanings given above.

The dyestuffs of Formula IA and IB as well as the other structurally closely related dyestuffs falling under Formula I are produced by reacting a dinitrodihydroxy-anthraquinone of formula

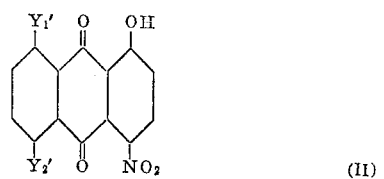

wherein $Y_1'$ and $Y_2'$ have the above given meanings with an amine of formula

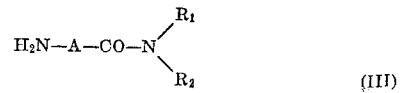

wherein A, $R_1$ and $R_2$ have the above given meanings, to form a nitrophenylamine-dihydroxyanthraquinone of formula

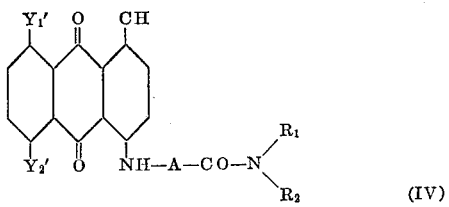

wherein A, $Y_1'$, $Y_2'$, $R_1$ and $R_2$ have the meanings given above and if desired, reducing the nitro group symbolised by $Y_1'$ or $Y_2'$, or replacing such nitro group by the amino group, a lower alkylamino group or by a hydroxy-lower alkylamino group. As lower akyl- or hydroxyalkylamino group, $Y_1'$ or $Y_2'$ represent for example the methylamino, ethylamino or β-hydroxyethylamino group.

A contains either no substituents apart from the carbamyl substituent given in the preceding formulas, or it contains as inert substituents groups or atoms conventional in dyestuffs which do not dissociate acid in water, for example, lower alkyl groups such as the methyl or ethyl group, or lower alkoxy groups such as the methoxy or ethoxy group, or halogens such as chlorine or bromine.

If desired, additional substituents can also be introduced into the radical A after the condensation to form the anthraquinone dyestuff of Formula IV has been performed, for example by after-treatment with a halogenating agent such as chlorine, bromine or sulfuryl chloride. Preferably, A is not further substituted.

$R_1$ and $R_2$ represent, as a lower alkyl or hydroxy-lower alkyl group, for example, the methyl, ethyl, a propyl, butyl or β-hydroxyethyl group; together with the nitrogen atom, they represent a 5- or 6- membered heterocyclic radical, particularly an N-pyrrolidyl, N-piperidyl or N-morpholyl radical. Preferably both $R_1$ and $R_2$ are methyl or ethyl.

Dinitrodihydroxy-anthraquinones used according to the invention as starting materials can be of the 1,5-dihydroxyanthraquinone series or the 1,8-dihydroxy-anthraquinone series; it is also often of advantage to use mixtures of these isomers in the process according to the invention.

As amines corresponding to Formula III can be used, for example, amides of 2-, 3- or 4-aminobenzoic acid, 3- or 5-methyl-2-aminobenzoic acid, 2- or 6-methyl-3-aminobenzoic acid, 2- or 3-methyl-4-aminobenzoic acid, 5-chloro- or 5-bromo-2-aminobenzoic acid, 4-chloro-3-aminobenzoic acid, 3-chloro- or 3-bromo-4-amino-benzoic acid or 4-methoxy-3-aminobenzoic acid, which amides are derived from primary or secondary lower alkylamines or hydroxy-lower alkylamines, e.g. from methylamine, ethylamine, propylamine, iso-propylamine, butylamine, β-hydroxyethylamine, dimethylamine or morpholine. By name can be mentioned, for example: 2-aminobenzoic acid-methylamide, -ethylamide, -dimethylamide or -diethylamide, 3-aminobenzoic acid-methylamide, -ethylamide, -propylamide, -isopropylamide, -butylamide, -dimethylamide, -diethylamide, -dipropylamide or -dibutylamide, 4-aminobenzoic acid-methylamide, -ethyl-amide, dimethylamide or -di-(β-hydroxyethyl)-amide, 3-aminobenzoic acid-methylethylamide or -methylisopropylamide.

They are obtained, for example, by reacting the chlorides or bromides of the nitrobenzene carboxylic acids corresponding to the aminobenzoic acids with the desired amines and reducing the nitro compounds obtained to the corresponding amino compounds.

The reaction of the dinitrodihydroxy-anthraquinones of Formula II with the amines of Formula III is performed in an excess of amine in the melt at 100–200°, advantageously however, in the presence of an inert organic solvent boiling at 120–200° such as butanol, glycol monoethyl ether, dimethyl formamide, or, preferably in the presence of an unsubstituted or preferably substituted hydrocarbon such as benzene, chlorobenzene, dichlorobenzene, and, in particular, nitrobenzene.

The new nitrophenylamino-dihydroxyanthraquinones of Formula IV generally crystallize from the reaction mixture and are obtained by filtration, dilution of the mixture with water or removal of the organic solvent by steam distillation. They can be purified by recrystallization. If necessary, the nitro group is reduced to the amino group, for example with glucose in aqueous-alkaline solution or, preferably, with sodium sulfide in aqueous or aqueous-organic medium, particularly in a mixture of water and pyridine. The nitro group can also be exchanged for the optionally substituted amino group by reaction with ammonia, a lower alkylamine or hydroxy-lower alkylamine such as methylamine, ethylamine or β-hydroxyethylamine.

It has also been found that organic polyester material can be dyed in surprisingly deep and fast shade yields by heating this material in a finely dispersed aqueous suspension of a novel dyestuff mixture consisting of at least one dyestuff of formula

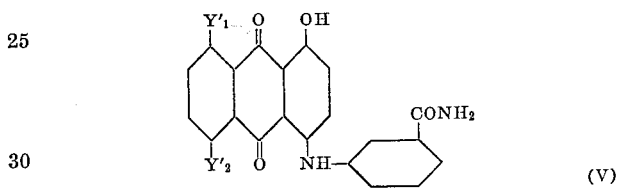

wherein one of $Y'_1$ and $Y'_2$ represents the hydroxyl group and the other Y represents the nitro group, and at least one other dyestuff of formula

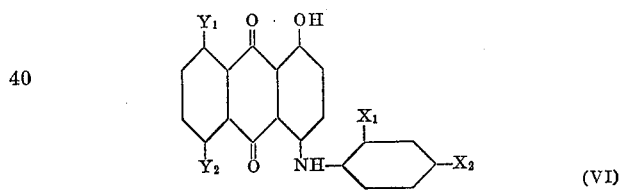

wherein one X of $X_1$ and $X_2$ represents hydrogen, the other X represents the $CONH_2$— group and of $Y_1$ and $Y_2$, one is the hydroxyl group and the other is the nitro group.

The components of the dyestuff mixture are preferably present therein in molar ratios ranging from about 3:1 to 1:3, and preferably being approximately 1:1.

The dyestuff mixtures according to the invention are distinguished by unexpectedly high drawing power on polyester material, while the compounds of Formula V used above are of unsatisfactory drawing power. Even a mixture of the compounds of Formulas VII and VII below is of far better drawing power than either of the components used alone.

Even cheeses can be dyed without difficulty with the dyestuff mixtures according to the invention and highly satisfactory results are obtained.

Particularly deep and good dyeings are obtained by using the above-mentioned mixtures of dyestuffs of the formulas (VII) 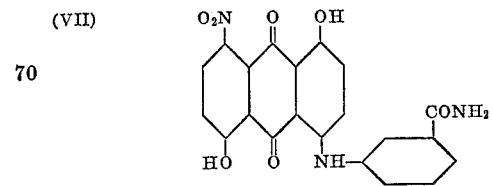

and

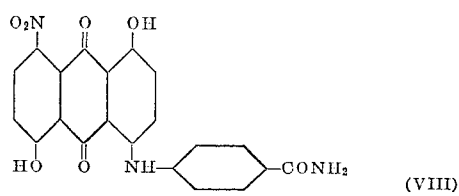

(VIII)

or a mixture of three isomeric dyestuffs of formula

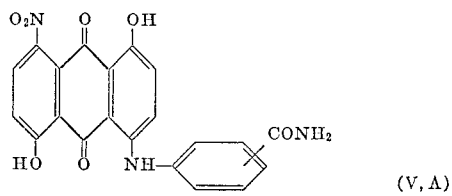

(V, A)

wherein the carboxylic acid amide group is in either the o- m- or p-position to the —NH group. According to the invention, a dye preparation is used advantageously which contains the dyestuff mixture as defined as well as wetting and dispersing agents and, perhaps, also fillers. The preparation can also be mixed with water and so used in the form of a paste.

The dye preparation contains, as wetting or dispersing agents, for example, capillary active, non-ionogenic substances such as polyglycol ethers of higher fatty alcohols, e.g. dodecyl alcohol polyglycol ether, or polyglycol ethers of alkyl phenols with a higher molecular alkyl radical, in particular an alkyl radical containing 8 to 16 carbon atoms, e.g. nonylphenyl polyglycol ether or polyalkylene oxide/fatty acid condensation products, e.g. condensation products of oleic acid and about 20 mols of ethylene oxide. In particular, the preparation contains anion active wetting or dispersing agents, e.g. dinaphthylmethane disulphonic acid or alkylnaphthalene sulphonic acids such as dibutyl naphthalene sulphonic acid, in the form of their alkali metal salts and also sulphite waste liquor (aqueous solution of the sodium salt of lignin sulphonic acid).

The dye preparation advantageously contains water soluble, non-ionogenic organic substances as fillers such as urea, starch or sugar.

The ratio of the dyestuff mixture to the other solid components is about 1:9 to 9:1 by weight, preferably about 1:3 to 3:1. The weight ratio of the dyestuffs of Formulas I and II, insofar as mixtures of two dyestuffs are used, is about 3:1 to 1:3, preferably about 1:1. If the mixture is made up of three or more components, then preferably about the same number of parts by weight of each is used.

The polyester material which can be dyed according to the invention is preferably in the form of fibers, e.g. cellulose ester, such as cellulose di- to tri-acetate fibers, chiefly however, it is in the form of fibres made from esters of aromatic polycarboxylic acids with polyfunctional alcohols, i.e. polyglycol terephthalates.

The fibres made from esters of aromatic polycarboxylic acids with polyvalent alcohols or from cellulose triacetate are dyed with the aqueous suspension to be used according to the invention at temperatures of 90 to 100° C., sometimes in the presence of carriers, e.g. trichlorobenzene or diphenyl, particularly however, phenylphenols such as o-phenylphenol. If necessary, the dyed goods are subsequently treated with hot air at about 180° C. Dyeing can also be performed under pressure in a closed vessel at temperatures of 100 to 140° C., preferably 125–135° C. Or the goods are pad dyed in a dyebath and the impregnated material is then heated to temperatures of about 180 to 250° C., preferably about 220° C. Cellulose-2½-acetate is dyed at temperatures of 60 to 90° C., advantageously at about 80 to 85° C.

The blue dyeings on organic polyester material attained with the dyestuff mixture according to the invention are distinguished over dyeings obtained in an analogous manner with the same amounts of individual components by remarkable deepness of shade. In addition, the dyeings have excellent fastness properties, in particular to sublimation, light and industrial fumes.

Dyestuffs employed in mixtures according to a further aspect of the invention fall under the formula

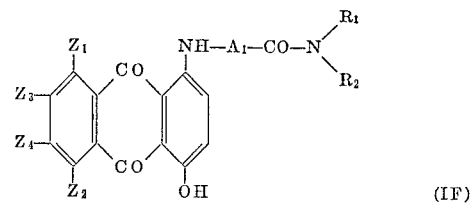

(IF)

wherein $Z_1$ and $Z_2$ represent hydrogen or the hydroxyl group, $Z_3$ and $Z_4$ represent hydrogen or, if $Z_1$ and $Z_2$ are hydrogen, they also represent halogen, especially chlorine or bromine, $A_1$ represents a phenylene radical which is unsubstituted or which contains substituents defined further below which do not dissociate acid in water, and $R_1$ and $R_2$ represent hydrogen, a lower alkyl, lower alkenyl or hydroxy-lower alkyl group, or $R_1$ and $R_2$ taken together with the nitrogen atom to which they are linked represent the radical of a 5- or 6-membered heterocyclic ring, especially the N-pyrrolidyl, N-piperidyl or N-morpholyl radical.

The dyestuffs of Formula IF, according to the third aspect of the invention are suitable for the dyeing of organic hydrophobic fibers from aqueous dispersion, e.g., for the dyeing of fibers from polymeric esters, in particular from esters of aromatic polycarboxylic acids with polyvalent alcohols such as polyglycol terephthalates in predominantly violet shades.

These dyestffs of Formula IF can also be used for the dyeing of synthetic polyamide fibers such as nylon, as well as for the dyeing of lacquers and spinning masses.

Polyester fibers are dyed with aqueous dispersions of the dyestuffs of Formula IF preferably at temperatures of over 100° under pressure. Very good dyeings are also obtained if polyester fibers are impregnated with concentrated aqueous dispersions of the dyestuffs according to the invention, the goods are squeezed out, dried and then the dyeing is fixed at temperatures of 180–250° C. The dyeing can also be performed, however, at the boiling point of the water in the presence of carriers such as phenylphenol, polychlorobenzene compounds or similar auxiliaries.

In some cases, the drawing power of the dyestuffs can even be improved by mixing two or more anthraquinone dyestuffs of Formula IF with each other, and different shades can be obtained by mixing them with dyestuffs of Formulas IA to IE, respectively.

The violet dyeings attained on polyester fibers with dyestuffs of Formula IF have very good wet, sublimation and light fastness properties.

The new dyestuffs of Formula IF are obtained by reacting, in the presence of boric acid or boric acid derivatives, an anthraquinone compound of the formula

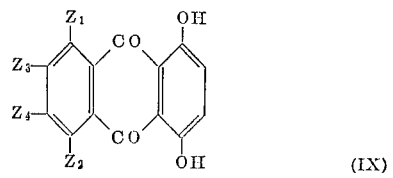

(IX)

wherein $Z_1$, $Z_2$, $Z_3$ and $Z_4$ have the same meanings as in Formula IF, or reacting a mixture of this compound and its leuco compound with an amine of the formula

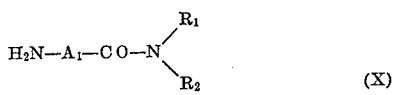

wherein $A_1$ represents a phenylene radical as defined above, and
$R_1$ and $R_2$ have the same meanings as in Formula IF.

Substituents which do not dissociate acid in water contained in $A_1$ are the groups or atoms usual in dyestuffs, for example, lower alkyl groups such as the methyl or ethyl group, or lower alkoxy groups such as the methoxy or ethoxy group, or halogens such as chlorine or bromine. If desired, additional substituents can also be introduced into the radical $A_1$ after the condensation to form the anthraquinone dyestuff or Formula IF has been performed, for example, by subsequent treatment with a halogenating agent such as chlorine, bromine or sulfuryl chloride. Preferably $A_1$ is not further substituted.

If $R_1$ and $R_2$ are a loweralkyl, a loweralkenyl or a lowerhydroxyalkyl group then they are e.g., the methyl, ethyl, a propyl, butyl or the allyl or β-hydroxyethyl group; if, together with the nitrogen atom they form a 5- or 6-membered ring, then they represent e.g., an N-pyrrolidyl, N-piperidyl or N-morpholyl radical. Preferably $R_1$ and $R_2$ are loweralkyl groups, in particular the methyl or ethyl group.

Examples of starting materials of Formula IX which can be used are 1,4-dihydroxy-anthraquinone (quinizarin), 1,4,5-trihydroxy-, 1,4,5,8-tetrahydroxy-, 1,4-dihydroxy-6-chloro- or 1,4-dihydroxy-6-bromo- and 1,4-dihydroxy-6,7-dichloro- or 1,4-dihydroxy-6,7-dibromo-anthraquinone.

Some of the amines of Formula X to be reacted with these compounds are known or can be produced by known methods, for example by condensation of a carboxylic acid chloride of the formula $$O_2N\text{---}A_1\text{---}CO\text{---}Cl \qquad (XI)$$

with an amine of the formula

wherein $A_1$, $R_1$ and $R_2$ have the meanings given in Formula IF, and subsequent reduction of the nitro group to the amino group.

The anthraquinone compound of Formula IX is reacted with an amine of Formula X advantageously in an excess of amine and, preferably, in the presence of an inert organic solvent. The reaction is performed preferably at temperatures up to about 100° C. Suitable solvents are e.g. alcohols, particularly lower alkanols such as methanol or ethanol, or alkylene glycols and monoalkyl ethers thereof, in the latter case, e.g. ethylene glycol monomethyl or monoethyl ether. The preferred solvent is ethanol.

The presence of boric acid or boric acid derivatives is important for the success of the reaction. By derivatives of boric acid are meant the esters, in particular the esters of boric acid with a 1,3-diol, e.g. with 1,3-propane diol. However, boric acid is generally preferred for the sake of simplicity.

A modification of the process consists in reacting an anthraquinone compound of the formula

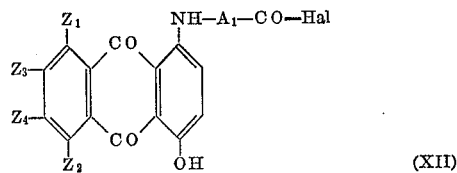

wherein Hal represents chlorine or bromine and $Z_1$, $Z_2$, $Z_3$ and $Z_4$ have the meanings given in Formula IF and
$A_1$ has the meaning given in Formula IF with ammonia or with an amine of the formula

wherein $R_1$ and $R_2$ have the meanings given in Formula IF, to form a compound of Formula IF.

The remarks made regarding $A_1$, $R_1$ and $R_2$ in the first process are also valid here.

Starting compounds of Formula XII are obtained, for example, by reacting an anthraquinone compound of Formula I with a carboxylic acid of the formula $$H_2N\text{---}A_1\text{---}COOH$$

and subsequently converting the carboxyl group into the carboxylic acid chloride or bromide group.

The reaction of the carboxylic acid chloride or bromide of Formula XII with the amine of Formula XIII is performed advantageously in aqueous medium and in an excess of the amine used; it can also be performed, however, in inert organic solvents, e.g. in acetone, dimethyl formamide, or in a hydrocarbon which may be substituted, such as toluene, xylene or chlorobenzene or dichlorobenzene, if necessary in the presence of acid binding agents such as sodium or potassium carbonate, sodium or potassium hydroxide solution, di- or tri-sodium phosphate or di- or tri-potassium phosphate, sodium or potassium acetate or tertiary nitrogen bases such as pyridine.

The new α-phenylaminoanthraquinone compounds of Formula IF generally crystallize from the reaction mixture and are isolated by filtration, dilution of the mixture with water or dilute mineral acid or removal of the organic solvent by steam distillation. If desired they can be purified by recrystallization.

In the pure state, the new dyestuffs are shimmering, crystalline, deeply colored substances. They dissolve in hot organic solvents with a pure violent color.

The following non-limitative examples illustrate this invention further. Where not otherwise expressly stated, parts and percentages are given by weight. The temperatures are in degrees centigrade. The relationship of parts by volume to parts by weight is as that of milliliters (ml.) to grams (g.). For the sake of simplicity in writing the formulas the double bonds of aromatic nuclei have sometimes been omitted.

Example 1

33 parts of 1,5-dihydroxy-4,8-dinitro-anthraquinone and 48 parts of 3-aminobenzoic acid diethylamide in 100 parts of nitrobenzene are heated for 2 hours at 150–155° while introducing nitrogen as propellent gas, and the water which is split off is distilled off through a sloping condenser. A blue solution is so formed from which, on cooling, the dyestuff formed of the formula

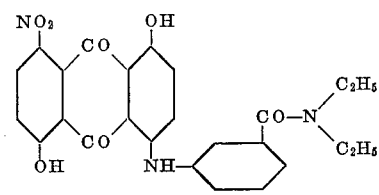

crystallises out direct. It is filtered off and recrystallised from 30 times the amount of pyridine. The product forms deep dark violet crystals which melt at 197–199°. The product dissolves in concentrated sulphuric acid and in pyridine with a deep blue colour.

The finely distributed dyestuff dyes polyester fibres from aqueous dispersion with the addition of o-phenylphenol as carrier in very fast clear blue shades. The dyeings attained therewith on terephthalic acid polyglycol ester fibres have excellent fastness to sublimation.

Instead of nitrobenzene, the condensation can also be performed in 1000 parts of ethylene glycol monoethyl ether by refluxing for 10 hours. The dyestuff crystallises out direct on cooling in this case too.

Example 2

33 parts of 1,5-dihydroxy-4,8-dinitro-anthraquinone and 45 parts of 3-aminobenzoic acid dimethylamide in 125 parts of nitrobenzene are heated for 1 hour at 160–165° until no more starting material can be traced chromatographically. At the same time, the water which is split off is distilled off in a stream of nitrogen. On cooling, the dark blue solution formed the dyestuff of the formula

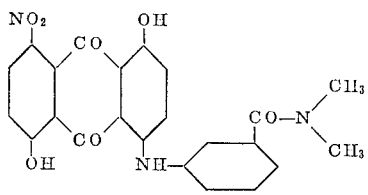

crystallises out. The separation out of the crystals can be completed by dilution with methanol. Recrystallised from pyridine, the product melts at 230–231°. It dissolves in concentrated sulphuric acid and in pyridine with a reddish blue colour. When milled with lignin sulphonate and a wetting agent, e.g. sodium dodecylbenzene sulphonate, the dyestuff dyes polyglycol terephthalate fibres from an aqueous dispersion in pure reddish blue shades. The dyeings have very good fastness to light and sublimation. The dyeings on acetate silk are excellently fast to industrial fumes.

Example 3

33 parts of 1,8-dihydroxy-4,5-dinitro-anthraquinone and 45 parts of 3-aminobenzoic acid dimethylamide in 100 parts of nitrobenzene are heated at 155–160° under a stream of nitrogen until no more starting material can be traced. At the same time the water which is split off is distilled off. On diluting the cooled blue solution with methanol, the dyestuff of the formula

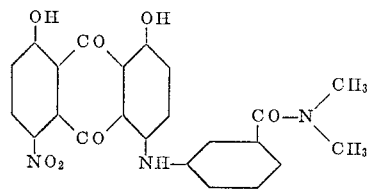

separates out in the form of a dark blue crystal powder. The dyestuff dissolves in sulphuric acid and in pyridine with a blue colour. It dyes polyester fibres from an aqueous dispersion in blue shades and the dyeings are fast to sublimation.

The condensation can also be performed in 900 parts of butanol instead of in nitrobenzene.

If the condensation is performed with 33 parts of a mixture of 16.5 parts of 1,5-dihydroxy-4,8-dinitro-anthraquinone and 16.5 parts of 1,8-dihydroxy-4,5-dinitro-anthraquinone instead of with 33 parts of 1,8-dihydroxy-4,5-dinitro-anthraquinone, then a dyestuff having similar properties is obtained.

Example 4

44.7 parts of the dyestuff described in Example 2 are added at 95° to the solution of 48 parts of crystallized sodium sulphide and the mixture is heated at 95–98° until the nitro compound has been completely changed into the amino dyestuff of the formula

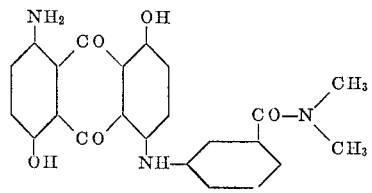

Recrystallised from pyridine, the new dyestuff melts at 238–240°. It dissolves in concentrated sulphuric acid with a green-blue and in pyridine with a neutral blue colour.

The finely distributed dyestuff dyes terephthalic acid polyglycol ester fibres from an aqueous dispersion in clear neutral blue shades which have excellent fastness to sublimation.

Example 5

33 parts of 1,5-dihydroxy-4,8-dinitro-anthraquinone and 61 parts of 3-aminobenzoic acid dibutylamide in 200 parts of nitrobenzene are heated at 180–185° while introducing nitrogen until no more water is distilled off and a blue solution is formed. The nitrobenzene is then removed with steam and the residue is boiled out with alcohol. A good yield is obtained of the dyestuff of the formula

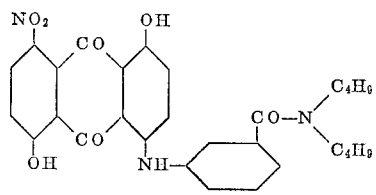

which melts at about 140°. By recrystallising from pyridine, it is obtained in a pure form. It dissolves in concentrated sulphuric acid and in pyridine with a blue colour. As a finely distributed aqueous dispersion, it dyes terephthalic acid polyglycol ester fibres in beautiful pure blue shades which have good fastness to light and sublimation.

If, instead of 33 parts of 1,5-dihydroxy-4,8-dinitro-anthraquinone, the same number of parts of a mixture of 1,5-dihydroxy-4,8-dinitro-anthraquinone and 1,8-dihydroxy-4,5-dinitro-anthraquinone are used as starting material, then a dyestuff having a somewhat more greenish blue shade is obtained.

A mixture which can be used of such starting materials is produced, for example, as follows:

Anthraquinone is nitrated, the polynitroanthraquinone is reacted with potassium hydroxide and phenol to form the mixture of the corresponding diphenoxyanthraquinones, this is then nitrated and the phenoxy groups are saponified to hydroxyl groups. In this way a mixture consisting mainly of 1,5-dihydroxy-4,8-dinitro-anthraquinone and 1,8-dihydroxy-4,5-dinitro-anthraquinone is obtained.

Example 6

44.7 parts of the dyestuff described in the first paragraph of Example 2 are heated in an autoclave for 6 hours at 125–130° with 100 parts of a 40% ethanolic methylamine solution.

After cooling, the dyestuff formed of the formula

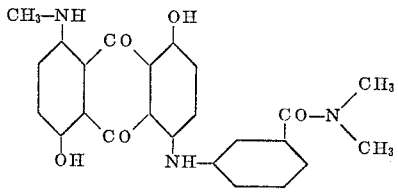

is filtered off. Recrystallised from pyridine, it is a dark crystal powder which dissolves in concentrated sulphuric acid and in pyridine with a blue colour.

The finely distributed dyestuff dyes terephthalic acid polyglycol ester fibres in aqueous dispersion in pure blue shades which are fast to light and sublimation.

Example 7

33 parts of 1,5-dihydroxy-4,8-dinitro-anthraquinone and 41 parts of 3-aminobenzoic acid in 400 parts of nitrobenzene are heated at 180–185° while passing a stream of nitrogen, and the water which is split off is distilled off through a sloping condenser. After cooling, the carboxylic acid of the formula

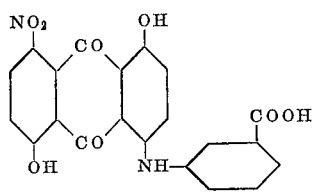

separates out in crystalline form. The carboxylic acid can be obtained in completely pure state by recrystallisation from pyridine. It then melts at 310° with decomposition.

42 parts of this acid are converted into the acid chloride by gently warming with 200 parts of thionyl chloride. Excess thionyl chloride is distilled off in vacuo and the residue is added to 220 parts of aqueous 41% dimethylamine solution. The product dissolves and the dimethylamide of the formula

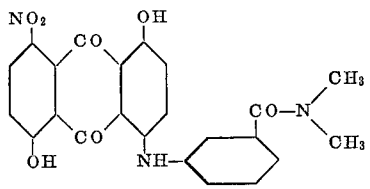

is formed. The product is isolated by acidifying with acid. Recrystallised from pyridine, it melts at 230–231° and is identical with the product obtained according to Example 2.

If instead of 41 parts of 3-aminobenzoic acid, 41 parts of 2-aminobenzoic acid are used, dyestuffs of quite similar properties are obtained. The corresponding carboxylic acid condensation products melt at 295–300° with decomposition and above 320° with decomposition, respectively.

Example 8

33 parts of 1,5-dihydroxy - 4,8 - dinitro-anthraquinone, 20.5 parts of 3-amino-benzoic acid-dimethylamide and 17 parts of 3-aminobenzoic acid-amide are heated 1 hour to 175–180° in 125 parts of nitrobenzene. The water which splits off is distilled off in a stream of nitrogen. After dilution with methanol and cooling, a mixture of dyestuffs of the formulae

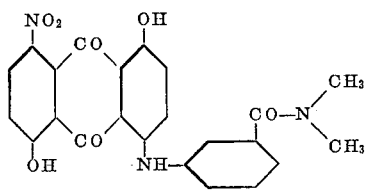

and

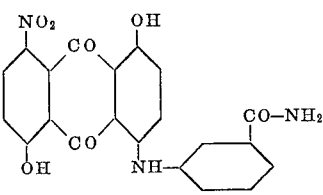

separate out. The finely distributed dyestuff mixture draws very good onto polyester fibres from an aqueous dispersion with the addition of o-phenylphenol as carrier, their drawing power is substantially better than the drawing power of the individual components.

A mixture of dyestuffs having equally good drawing power onto polyester fibres can be obtained by mixing the two above named dyestuffs in a ratio of 1:3 to 3:1, preferably in a ratio of 1:1.

Mixtures of dyestuffs with similarly good drawing power are obtained by condensing 33 parts of 1,5-dihydroxy-4,8-dinitro-anthraquinone with a mixture of 23.3 parts of 3-aminobenzoic acid-diethylamide and 17 parts of 3-aminobenzoic acid-amide, or with a mixture of 20.8 parts of 3-aminobenzoic-acid-ethylamide and 23.3 parts of 3-aminobenzoic acid-diethylamide or with a mixture of 23.3 parts of 4-aminobenzoic acid-diethylamide and 17 parts of 3-aminobenzoic acid-amide.

Example 9

44.7 parts of the mixture of nitro compounds described in Example 8 are heated to boiling for 1 hour in a solution of 12 parts of sodium hydrosulfide in 120 parts of water and 120 parts of pyridine. After cooling, the reduced product is filtered off and washed with water until the filtrate running off is neutral.

The mixture of amino compounds of the formulae

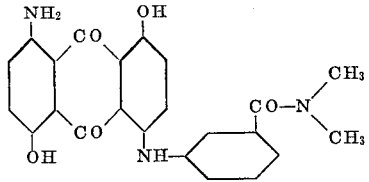

and

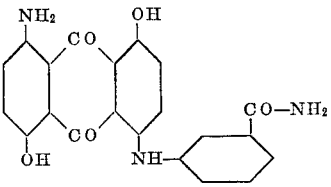

which is obtained has a substantially better drawing power on acetate rayon than the individual components.

Dyestuffs with similar properties are obtained by mixing amino compounds of the formula

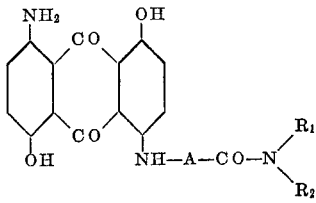

wherein the

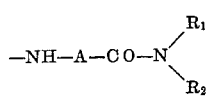

radicals have the following meanings:

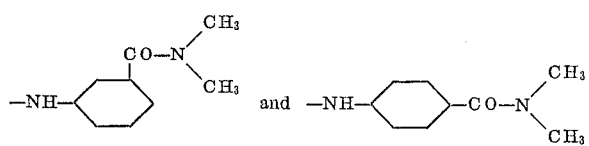

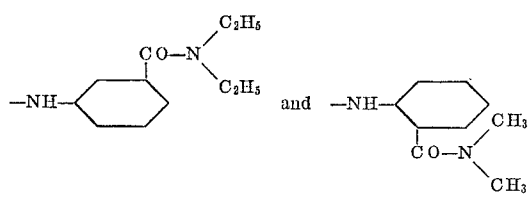

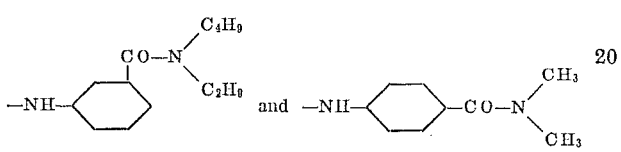

As has been stated in Example 8, these mixtures can also be obtained by condensing 1,5 - dihydroxy - 4,8 - dinitroanthraquinone with a mixture of the corresponding aminobenzoic acid-dialkyl-amides and afterwards reducing the nitro group to the amino group.

Example 10

42 parts of the nitro carboxylic acid described in the first paragraph of Example 7 are added at 85–90° to the solution of 12 parts of sodium hydrosulphide in 240 parts of water. The nitro carboxylic acid is dissolved for a short time and then the amino carboxylic acid of the formula

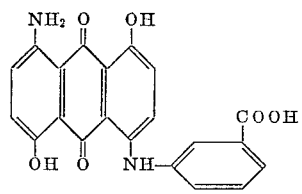

precipitates in the form of its sodium salt. This is filtered off, slurried in 500 parts of water and 20 parts of concentrated hydrochloric acid, the slurry is filtered and then dried. The amino carboxylic acid so obtained can be recrystallized from nitrobenzene or pyridine.

39 parts of the amino carboxylic acid are suspended in 100 parts of thionyl chloride and the suspension is stirred for 24 hours at room temperature whereupon the acid is converted into its acid chloride. The excess thionyl chloride is filtered off and washed with ether. The acid chloride obtained is added to 200 parts of aqueous 41% dimethylamine solution and the whole is stirred for 5 hours at room temperature, then diluted with 1000 parts of water and acidified with about 160 parts of concentrated hydrochloric acid. The product which precipitates is filtered off and washed neutral with water. The dyestuff obtained of the formula

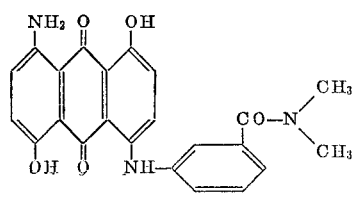

can be recrystallised from pyridine and then melts at 238–240°. It dyes terephthalic acid polyglycol ester fibres from an aqueous dispersion in clear neutral blue shades which have excellent fastness to sublimation.

The reaction of the acid chloride with dimethylamine can also be performed in benzene solution. Also, 41 parts of the acid chloride can be reacted with 75 parts of diethylamine in benzene solution whereupon the corresponding amino carboxylic acid diethylamide derivative is obtained.

Example 11

43 parts of the nitro carboxylic acid described in paragraph 1 of Example 7 and 100 parts of a 40% ethanolic methylamine solution are heated in an autoclave for 6 hours at 125–130°. After cooling, the methylamino carboxylic acid formed of the formula

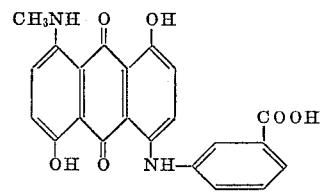

is precipitated by acidification and is filtered off.

This methylamino carboxylic acid is converted by way of its chloride into the corresponding carboxylic acid dimethylamide of the formula

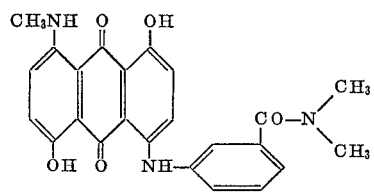

analogously to the method described in paragraph 2 of Example 7.

Example 12

2 parts of the finely ground dyestuff obtained according to Example 4 are dispersed in 4000 parts of water. 12 parts of the sodium salt of o-phenylphenol and 12 parts of diammonium phosphate are added to this suspension and 100 parts of a terephthalic acid polyglycol ester fabric are dyed for 1½ hours at 95–98°. The dyeing is rinsed and thoroughly washed with a very dilute sodium hydroxide solution which contains dodecyl polyglycol ether as dispersing agent. A blue dyeing which is fast to light, wet and sublimation is obtained.

If instead of using 2 parts of the dyestuff according to Example 4, dyeing is performed with the mixture of 1 part of dyestuff according to Example 4 and 1 part of the dyestuff of the formula

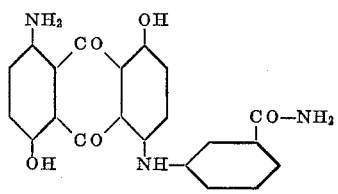

then a pure blue dyeing is obtained on terephthalic acid polyglycol ester fibres which is fast to sublimation.

The dyeing obtained on acetate silk with this dyestuff mixture has excellent fastness to industrial fumes; that obtained on cellulose triacetate has excellent fastness to sublimation.

Example 13

2 parts of the dyestuff obtained according to Example 2 are finely milled and suspended in 4000 parts of water which contains 2 parts of the sodium salt of the condensation product of naphthalene-2-sulphonic acid and formaldehyde as dispersing agent. The pH of the dyebath is adjusted to 6.5 with acetic acid.

100 parts of terephthalic acid polyglycol ester fabric are introduced at 40°, the bath is heated within 15 minutes in the autoclave to 140° and kept for 45 minutes at this temperature. The dyeing so obtained is rinsed with water, and soaped. In this way a clear blue dyeing is obtained which has excellent fastness to light, wet and sublimation.

The dyestuffs given in the following Table I of the formula

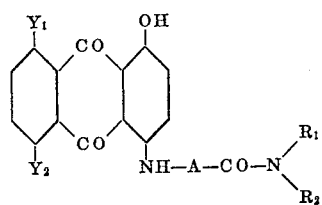

are produced as described in the preceding examples:

TABLE I

| No. | $Y_1$ | $Y_2$ | $-NH-A-CO-N\diagdown^{R_1}_{R_2}$ | Shade on polyglycol terephthalate |
|---|---|---|---|---|
| 1 | $NO_2$ | OH | NNH—⟨ ⟩—CO—NH—CH$_3$ | Blue. |
| 2 | $NO_2$ | OH | —NH—⟨ ⟩(CH$_3$)—CO—N(CH$_3$)$_2$ | Do. |
| 3 | $NO_2$, OH | OH, $NO_2$ | —NH—⟨ ⟩—CO—NH—CH$_3$  Mixture 1:1. | Do. |
| 4 | OH | $NO_2$ | —NH—⟨ ⟩—CO—NH—C$_2$H$_5$ | Do. |
| 5 | $NO_2$ | OH | —NH—⟨ ⟩—CO—NH—CH(CH$_3$)$_2$ | Do. |
| 6 | $NO_2$ | OH | —NH—⟨ ⟩—CO—NH—C$_4$H$_9$ | Do. |
| 7 | $NO_2$ | OH | —NH—⟨ ⟩—CO—NH—CH$_3$ | Do. |
| 8 | $NO_2$ | OH | —NH—⟨ ⟩—CO—N(piperidino) | Do. |
| 9 | $NO_2$ | OH | —NH—⟨ ⟩—CO—N(morpholino) | Do. |
| 10 | $NO_2$ | OH | —NH—⟨ ⟩—CO—N(C$_2$H$_5$)$_2$ | Do. |

TABLE I—Continued
| No. | $Y_1$ | $Y_2$ | $-NH-A-CO-N\begin{smallmatrix}R_1\\R_2\end{smallmatrix}$ | Shade on polyglycol terephthalate |
|---|---|---|---|---|
| 11 | $NO_2$ | OH | 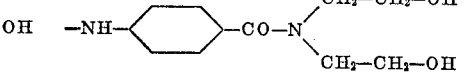 | Do. |
| 12 | $NO_2$ | OH | 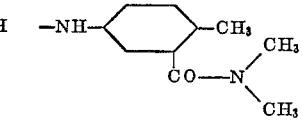 | Do. |
| 13 | $NO_2$ | OH | 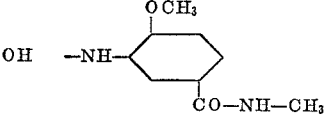 | Do. |
| 14 | $NO_2$ | OH | 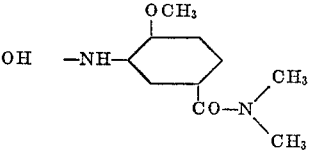 | Do. |
| 15, 16 | OH | $NO_2$ | 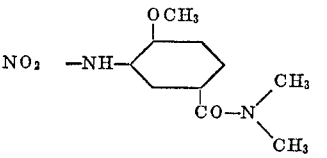 | Do. |
| 17, 18 | $NH_2$ | OH | 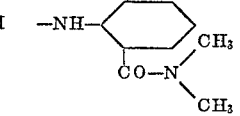 | Do. |
| 19 | $NH_2$ | OH | 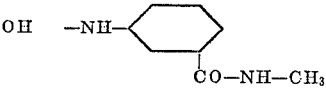 | Do. |
| 20 | $NH_2$ | OH | 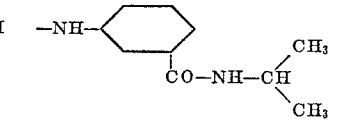 | Do. |
| 21 | OH | $NH_2$ | 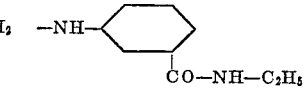 | Do. |
| 22 | $NH_2$ | OH | 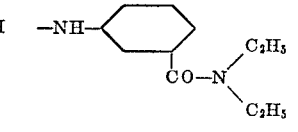 | Do. |
| 23 | $NH_2$ | OH | 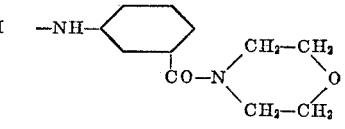 | Do. |
| 24 | $NH_2$ | OH |  | Do. |
| 25 | $NH_2$ | OH | 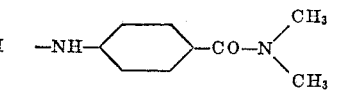 | Do. |

TABLE I—Continued

| No. | Y₁ | Y₂ | −NH−A−CO−N(R₁)(R₂) | Shade on polyglycol terephthalate |
|---|---|---|---|---|
| 26 | NH₂ | OH | −NH−[4-CH₃-cyclohexyl]−CO−N(CH₃)₂ | Do. |
| 27 | OH | NH₂ | −NH−[cyclohexyl]−CO−N(CH₃)₂ | Do. |
| 28 | {NH₂ / OH} | {OH / NH₂} | −NH−[cyclohexyl]−CO−N(CH₃)₂ (1:1 mixture) | Do. |
| 29 | NO₂ | OH | −NH−[cyclohexyl with CO−NH−CH₂CH−CH₂] | Do. |
| 30 | NO₂ | OH | −NH−[cyclohexyl]−CO−N(CH₂−CH=CH₂)₂ | Do. |
| 31 | OH | NO₂ | −NH−[cyclohexyl]−CO−N(CH₂−CH=CH₂)₂ | Do. |
| 32 | NH₂ | OH | −NH−[cyclohexyl with CO−NH−CH₂−CH CH₂] | Do. |
| 33 | NH₂ | OH | −NH−[cyclohexyl]−CO−N(CH₂−CH=CH₂)₂ | Do. |
| 34 | NHC₂H₅ | OH | −NH−[cyclohexyl]−CO−N(CH₃)₂ | Do. |
| 35 | NHCH₂CH₂OH | OH | −NH−[cyclohexyl]−CO−N(CH₃)₂ | Do. |
| 36 | NO₂ | OH | −NH−[cyclohexyl]−CO−NH−CH₂−CH₂OH | Do. |
| 37 | NO₂ | OH | −NH−[2-Cl-cyclohexyl]−CO−N(CH₃)₂ | Do. |
| 38 | NO₂ | OH | −NH−[Br-cyclohexyl]−CO−N(CH₃)₂ | Do. |
| 39 | NO₂ | OH | −NH−[cyclohexyl]−CO−N(pyrrolidinyl) | Do. |

Example 14

33 parts of 1,5-dihydroxy-4,8-dinitro-anthraquinone and 53 parts of 4-aminobenzoic acid diethylamide in 200 parts of nitrobenzene are heated at 180–185° while introducing nitrogen until no more water is distilled off and a blue solution is formed. The nitrobenzene is then removed with steam and the residue extracted with boiling alcohol. A good yield is obtained of the dyestuff of the formula

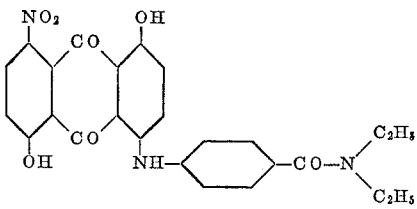

by recrystallizing from pyridine, it is obtained in pure form. It dissolves in concentrated sulfuric acid and in pyridine with a blue color.

If, instead of 33 parts of 1,5-dihydroxy-4,8-dinitro-anthraquinone, the same number of parts of a mixture of 1,5-dihydroxy - 4,8 - dinitro-anthraquinone and 1,8-dihydroxy-4,5-dinitro-anthraquinone are used as starting material, then a dyestuff having a somewhat more greenish blue shade is obtained.

A mixture of such starting materials is produced as described in Example 5.

This mixture of starting materials is then used in the reaction with 4-aminobenzoic acid diethylamide described above in this example.

There results a mixture, in a molar ratio of about 1:1, of the dyestuff of the formula given above in this example, and the dyestuff of the formula

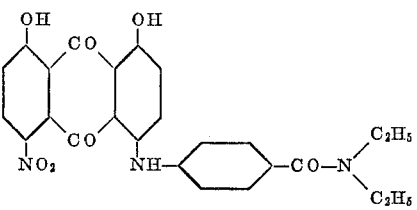

As a finely distributed aqueous dispersion, it dyes terephthalic acid polyglycol ester fibers in beautiful pure blue shades which have good fastness to light and sublimation.

Similarly good results are obtained when using instead a mixture of a dyestuff of the first formula given in this example, and the dyestuff of Example 2, in a molar ratio of about 2:1.

Example 15

44.7 parts of the dyestuff described in the first paragraph of Example 1 are heated in an autoclave for 6 hours at 125–130° with 100 parts of a 40% ethanolic methylamine solution. After cooling, the dyestuff formed of the formula

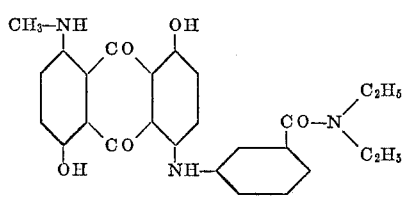

is filtered off. Recrystallized from pyridine, it is a dark crystal powder which dissolves in concentrated sulfuric acid and in pyridine with a blue color.

The finely distributed dyestuff dyes terephthalic acid polyglycol ester fibers in aqueous dispersion in pure blue shades which are fast to light and sublimation.

Example 16

33 parts of 1,5-dihydroxy-4,8-dinitroanthraquinone and 37.5 parts of 3-aminobenzoic acid methylamide in 100 parts of nitrobenzene are heated for 2 hours at 150–155° while introducing nitrogen as propellent gas, and the water which is split off is distilled off through a sloping condenser. A blue solution is so formed from which, on cooling, the dyestuff of the formula

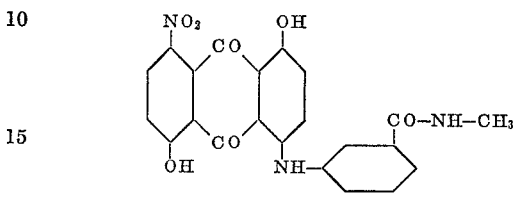

crystallizes out direct. It is filtered off and recrystallized from 30 times the amount of pyridine. The product forms deep dark violet crystals which melt at 275–278°. The product dissolves in concentrated sulfuric acid and in pyridine with a deep blue color.

Instead of using nitrobenzene, the condensation can also be performed in 1000 parts of ethylene glycol monoethyl ether by refluxing for 10 hours. In this case the dyestuff also crystallizes out directly on cooling.

The dyestuff produced as described above in this example is then intimately mixed with an equimolar amount of the dyestuff produced as described in Example 2.

The finely distributed dyestuff mixture dyes polyester fibers from aqueous dispersion with the addition of o-phenylphenol as carrier in very fast clear blue shades. The dyeings attained therewith on terephthalic acid polyglycol ester fibers have excellent fastness to sublimation.

Example 17

1 part of the dyestuff of the formula

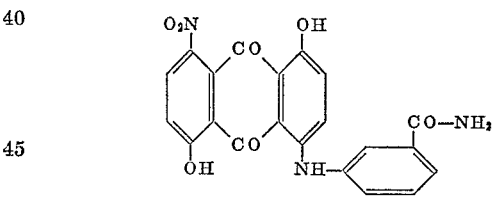

and 1 part of the dyestuff of the formula

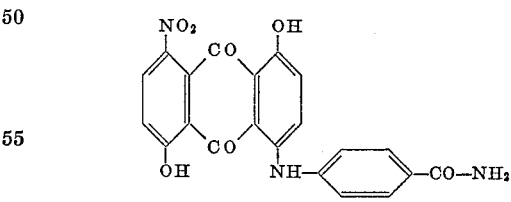

are milled together with 2 parts of the sodium salt of lignin sulphonic acid and 2 parts of the sodium salt of dinaphthylmethane disulphonic acid in the presence of water and of quartz sand as milling agent, until the average particle size is of about one micron. The finely dispersed suspension obtained is passed through a sieve to remove the milling agent, whereupon it is evaporated to dryness.

(A) Dyeing on polyglycol terephthalate.—3 parts of this dye preparation are dispersed in 4000 parts of water. 2 parts of the sodium salt of dinaphthylmethane disulphonic acid, 20 parts of diammonium phosphate and 20 parts of the sodium salt of o-phenylphenol as carrier are added to this dispersion, and 100 parts of a polyglycol terephthalate fabric are dyed in this dyebath by heating for 1½ hours at 95–98°. The dyeing is rinsed, washed for 20 minutes at 90° with 2000 parts of a 0.03 N sodium hydroxide solution containing 2 parts of dodecyl polyglycol ether as dispersing agent, and then the dyeing is thermofixed by a hot air treatment at 180°. A deep blue dyeing is obtained which is fast to light, wet and sublimation.

(B) Dyeing on cellulose-2½-acetate (acetate rayon).— 3 parts of the dye preparation described in the first paragraph of this example are dispersed in 4000 parts of 45° warm water containing 8 parts of Marseilles soap. 100 parts of a cellulose-2½-acetate fabric are introduced, the temperature is raised within half an hour to 80° and the bath is maintained at this temperature for another hour. The goods are then rinsed and dried.

A deep blue dyeing having excellent fastness to industrial fumes is obtained.

(C) Dyeing on cellulose triacetate fabric.—3 parts of the dye preparation described in the first paragraph of this example are dispersed in 4000 parts of water containing 2 parts of Marseilles soap. 100 parts of cellulose triacetate fabric are dyed with this liquor for 1½ hours at the boil. After rinsing, a deep blue dyeing having very good fastness to sublimation is obtained.

(D) High temperature dyeing on polyglycol terephthalate fabric.—3 parts of the dye preparation according to paragraph 1 of this example are dispersed in 2000 parts of water containing 2 parts of the sodium salt of dinaphthylmethane disulphonic acid. The pH of the dispersion is adjusted to 5.5 with acetic acid. 100 parts of polyglycol terephthalate fabric are introduced at 40°, the bath is heated within 15 minutes in a closed vessel under pressure to 130° and kept for 45 minutes at this temperature. After rinsing, the dyeing is soaped at the boil. In this way, a deep blue dyeing is obtained which is fast to sublimation.

Dyeings of similar quality are obtained on the fibres mentioned if, instead of the dye preparation mentioned in the first paragraph of this example, a preparation is used which consists of the components given in the following Table II in the weight ratios given in column IV thereof and which is otherwise produced by the method described in the first paragraph of this example, and if otherwise the procedure given in paragraphs A, B, C, or D is followed.

Example 29

1 part of the dyestuff of the formula

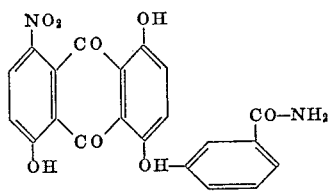

and 1 part each of the o-carboxylic acid amide and p-carboxylic acid amide isomers are dissolved in 30 parts of concentrated sulphuric acid and the solution is then poured into 300 parts of water in which there are 6 parts of a 50% sodium-lignin sulphonate solution. The product which is precipitated is filtered off and washed neutral. The filter cake is milled for 3 hours with 30 parts of saturated sodium chloride solution and 10 parts of sodium chloride until the particle size is about 1 micron. The solid sodium chloride is then dissolved by the addition of 100 parts of water, the solution is filtered and washed with water until the filtrate contains no more sodium chloride. 3 parts of sodium-lignin sulphonate and sufficient water are then added to the filter cake so that an about 30% dyestuff paste is obtained which can be dispersed well in water.

Polyglycol terephthalate, cellulose-2½-acetate or cellulose triacetate fabric is dyed with this paste according to Example 17 paragraph A, B, C or D. Dyeings of a deep blue colour are obtained in this way and the dyeings have excellent fastness properties.

Dyeings of similar quality are obtained on the dyeings mentioned if, instead of the dye preparation mentioned in the first paragraph of this example, a preparation is used which consists of the components given in the following Table III in the weight ratios given in column V of this table, and which is prepared by the method described in paragraph 1 of Example 1 or 2 and, if otherwise, the procedure given in paragraphs A, B, C or D of Example 17 is followed.

TABLE II

Dyestuff of the formula:

| I | II | | | III | | | IV |
|---|---|---|---|---|---|---|---|
| | Dyestuff I | | | Dyestuff II | | | Weight ratio of dyestuff I:dyestuff II:dispersing agent (e.g. sodium-lignin sulphonate) |
| Ex. | $Y_1$ | $Y_2$ | Position of $CO-NH_2$ group | $Y_1$ | $Y_2$ | Position of $CO-NH_2$ group | |
| 18 | $NO_2$ | OH | m | $NO_2$ | OH | p | 5:4:1 |
| 19 | $NO_2$ | OH | m | $NO_2$ | OH | p | 1:1:18 |
| 20 | $NO_2$ | OH | m | $NO_2$ | OH | p | 2:1:9 |
| 21 | $NO_2$ | OH | m | $NO_2$ | OH | p | 4:1:10 |
| 22 | $NO_2$ | OH | m | $NO_2$ | OH | p | 1:3:8 |
| 23 | $NO_2$ | OH | m | $NO_2$ | OH | o | 3:1:4 |
| 24 | OH | $NO_2$ | m | OH | $NO_2$ | p | 1:1:6 |
| 25 | OH | $NO_2$ | m | OH | $NO_2$ | o | 4:1:1 |
| 26 | OH | $NO_2$ | m | $NO_2$ | OH | p | 1:3:1 |
| 27 | $NO_2$ | OH | m | OH | $NO_2$ | p | 3:2:5 |
| 28 | $NO_2$ | OH | m | OH | $NO_2$ | o | 1:1:8 |

TABLE III

Dyestuffs of the formula:

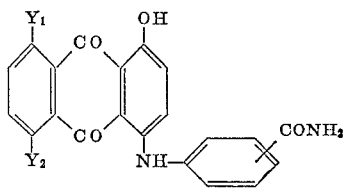

| | II | | | III | | | IV | | V |
|---|---|---|---|---|---|---|---|---|---|
| | Dyestuff I | | | Dyestuff II | | | Dyestuff III | | Group ratio dyestuff I:dyestuff II:dyestuff III:dispersing agent (e.g. sodium-(lignin sulphonate) |
| Example | $Y_1$ | $Y_2$ | Position of $CONH_2$ group | $Y_1$ | $Y_2$ | Position of $CONH_2$ group | $Y_1$ | $Y_2$ | Position of $CONH_2$ group | |
| 30 | OH | $NO_2$ | m | OH | $NO_2$ | o | OH | $NO_2$ | p | 2:2:1:15 |
| 31 | $NO_2$ | OH | m | OH | $NO_2$ | m | OH | $NO_2$ | o | 2:1:2:10 |
| 32 | $NO_2$ | $NO_2$ | m | OH | $NO_2$ | m | $NO_2$ | OH | p | 1:1:1:9 |
| 33 | $NO_2$ | OH | m | $NO_2$ | OH | p | OH | $NO_2$ | o | 9:3:1:13 |
| 34 | $NO_2$ | OH | m | $NO_2$ | OH | p | OH | $NO_2$ | p | 3:1:1:5 |

Example 35

A mixture of 36 parts of quinizarin and 12 parts of leucoquinizarin is stirred for 1 hour at 60–65° with 54.4 parts of m-aminobenzoic acid amide and 30 parts of ortho-boric acid in 200 parts of ethanol. At the end of this time, the reaction mixture is diluted with 500 parts of ethanol and the reaction product formed is filtered off and washed with ethanol.

After recrystallising from 20 times the amount of pyridine, the dyestuff of the formula

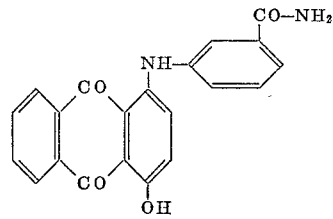

is obtained in the form of dark crystals which melt at 196–198° and which dissolve in organic solvents with a violet, in concentrated sulphuric acid with a blue colour.

From an aqueous dispersion the dyestuff dyes polyglycol terephthalate fibres in clear, violet shades which are fast to sublimation, light and wet.

If instead of the 36 parts of quinizarin, equimolar amounts of the hydroxyanthraquinones given in column II of the following table are used and instead of the 54.4 parts of m-aminobenzoic acid amide, equimolar amounts of the aminobenzoic acid amides given in column III of this table are used, then with otherwise the procedure described in the example, dyestuffs are obtained which dye polyglycol terephthalate fibres in equally fast violet shades.

TABLE IV

| I | II | | | | III | IV |
|---|---|---|---|---|---|---|
| No. | Hydroxyanthraquinone | | | | Amino-benzoic acid amide | Shade on Polyglycol-terephthalate fibres |
| | $Z_1$ | $Z_2$ | $Z_3$ | $Z_4$ | $H_2N-A-CO-N\begin{smallmatrix}R_1\\R_2\end{smallmatrix}$ | |
| 36 | H | H | H | H | $H_2N-\langle\;\rangle-CO-NH_2$ | Violet. |
| 37 | H | H | H | H | $H_2N-\langle\;\rangle$, $CO-NHCH_3$ | Do. |
| 38 | H | H | H | H | $H_2N-\langle\;\rangle$, $CO-N(CH_3)_2$ | Do. |
| 39 | H | H | H | H | $H_2N-\langle\;\rangle$, $CO-NHC_2H_5$ | Do. |
| 40 | H | H | H | H | $H_2N-\langle\;\rangle$, $CO-NH-C_4H_9$ | Do. |

TABLE IV—Continued

| No. | Hydroxyanthraquinone | | | | Amino-benzoin acid amide | Shade on Polyglycol-terephthalate fibres |
|---|---|---|---|---|---|---|
| | $Z_1$ | $Z_2$ | $Z_3$ | $Z_4$ | | |
| 41 | H | H | H | H | $H_2N-C_6H_4-CO-NH-CH(CH_3)_2$ | Do. |
| 42 | H | H | H | H | $H_2N-C_6H_4-CO-N(C_2H_5)_2$ | Do. |
| 43 | H | H | H | H | $H_2N-C_6H_4-CO-N(C_3H_7)_2$ | Do. |
| 44 | H | H | H | H | $H_2N-C_6H_4-CO-N(C_4H_9)_2$ | Do. |
| 45 | H | H | H | H | $H_2N-C_6H_4-CO-N(CH_2-CH=CH_2)_2$ | Do. |
| 46 | H | H | H | H | $H_2N-C_6H_4-CO-N\langle(CH_2)_5\rangle$ (piperidide) | Do. |
| 47 | H | H | H | H | $H_2N-C_6H_4-CO-NH-CH_3$ (para) | Do. |
| 48 | H | H | H | H | $H_2N-C_6H_4-CO-N(C_2H_5)_2$ (para) | Do. |
| 49 | H | H | H | H | $H_2N-C_6H_4-CO-N\langle(CH_2CH_2)_2O\rangle$ (morpholide) | Do. |
| 50 | H | H | H | H | $H_2N-C_6H_4-CO-N(CH_2-CH_2-CH)_2$ | Do. |
| 51 | H | OH | H | H | $H_2N-C_6H_4-CO-N(CH_3)_2$ | Do. |
| 52 | OH | OH | H | H | $H_2N-C_6H_4-CO-N(CH_3)_2$ | Do. |
| 53 | H | H | Cl | Cl | $H_2N-C_6H_4-CO-N(CH_3)_2$ | Do. |

TABLE IV—Continued

| No. | Hydroxyanthraquinone | | | | Amino-benzoic acid amide | Shade on Polyglycol-terephthalate fibres |
|---|---|---|---|---|---|---|
| | $Z_1$ | $Z_2$ | $Z_3$ | $Z_4$ | $H_2N-A-CO-N(R_1)(R_2)$ | |
| 54 | H | H | H | Cl | H₂N—⌬—CO—NH₂ | Do. |
| 55 | H | H | H | H | H₂N—⌬(—CH₃)—CO—N(CH₃)(CH₃) | Do. |
| 56 | H | H | H | H | H₂N—⌬(—COH₃)—CO—N(C₂H₅)(C₂H₅) | Do. |
| 57 | H | H | H | H | H₂N—⌬(—Cl)—CO—N(CH₃)(CH₃) | Do. |
| 58 | H | OH | H | H | H₂N—⌬—CO—NH₂ | Do. |
| 59 | OH | OH | H | H | H₂N—⌬—CO—N(CH₃)(CH₃) | Do. |
| 59a | H | H | H | H | NH₂—⌬—CO—N(CH₂—CH₂)(CH₂—CH₂) | Do. |

Example 60

A mixture of 36 parts of quinizarin and 12 parts of leucoquinizarin is heated for 6 hours at 60–65° with 66 parts of m-aminobenzoic acid dimethylamide and 30 parts of ortho boric acid in 200 parts of ethanol whereupon a complete solution is attained. The reaction product is precipitated by dilution with water, unchanged quinizarin is removed by extraction with 1000 parts of 1 N sodium hydroxide solution and the product is purified by recrystallising from ten times the amount of xylene. The dyestuff of the formula

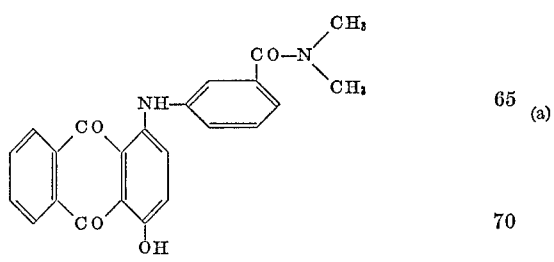

is obtained in the form of dark crystals which melt at 165–168°.

When milled with lignin sulphonate and the sodium salt of dinaphthyl methane sulphonic acid as a wetting agent in aqueous suspension, the finely dispersed dyestuff dyes polyglycol terephthalate fibres and also acetate silk or cellulose triacetate fibres in beautiful, pure violet shades. The dyeings have very good fastness to sublimation.

(a) By using in the above example, paragraph 1, instead of the 66 parts of m-aminobenzoic acid dimethylamide, a mixture of equimolar parts of m-aminobenzoic acid diethylamide and o-aminobenzoic acid dimethylamide, then a mixture of both dyestuffs of the formulae is obtained (a) 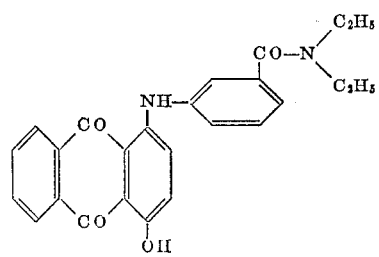

and (b)
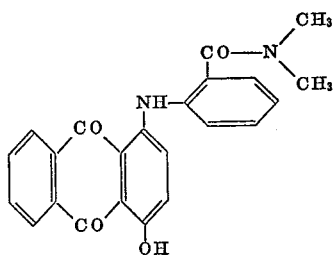

From an aqueous dispersion the finely dispersed dyestuff mixture dyes polygolycol terephthalate fibres in violet shades which are fast to sublimation.

(b) A mixture of 32 parts of quinizarin and 12 parts of leucoquinizarin is heated for 6 hours at 60–65° with 66 parts of o-aminobenzoic acid dimethylamide and 28.8 parts of the ester obtained from ortho boric acid and 2-methyl-pentane-2,4-diol of the formula

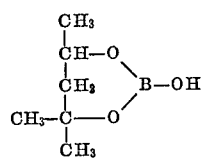

in 200 parts of 2-methyl-pentane-2,4-diol. The obtained reaction mixture is then diluted with water and the precipitated dyestuff is filtered off and unreacted quinizarin is removed by extraction with 1000 parts of 1 N sodium hydroxide solution. After recrystallisation of the crude product from four times the amount of pyridine, the dyestuff of the formula

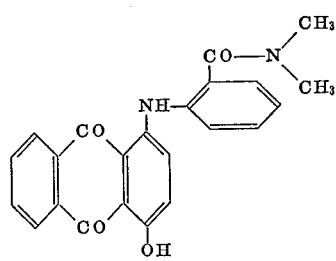

is obtained in the form of pure, dark crystals which melt at 227–228°. The product is identical with the dyestuff (b) of the Example 26.

The finely dispersed dyestuff dyes polyglycol terephthalate fibres from an aqueous dispersion in reddish violet shades which have very good wet fastness properties.

Example 61

A mixture of 41.2 parts of 6-chloroquinizarin and 13 parts of 6-chloroleucoquinizarin is heated for 2 hours at 65–70° with 77 parts of m-aminobenzoic acid diethylamide and 30 parts of ortho boric acid in 200 parts of ethanol. After cooling, the precipitated product is filtered off and unchanged 6-chloroquinizarin is removed by extraction with 1 N sodium hydroxide solution. The crude dyestuff obtained of the formula

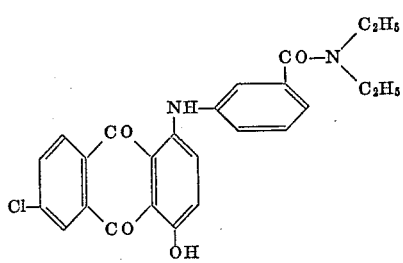

is purified by recrystallisation from pyridine.

When dyed from an aqueous dispersion on polyglycol terephthalate fibres, clear violet dyeings are attained with the dyestuff which have excellent sublimation, light and wet fastness properties.

If instead of the mixture mentioned of 6-chloroquinizarin and 6-chloroleucoquinizarin, a mixture of 46.5 parts of 6,7-dichloroquinizarin and 15.5 parts of 6,7-dichloroleucoquinizarin or a mixture of equivalent amounts of 6,7-dibromoquinizarin and 6,7-dibromoleucoquinizarin is used, then with otherwise the procedure as described in the example, the dyestuff of the formula

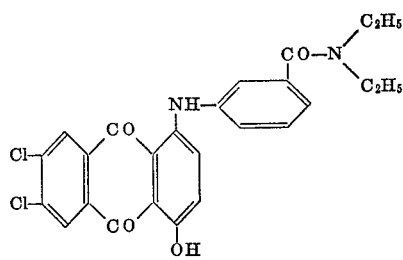

or of the formula

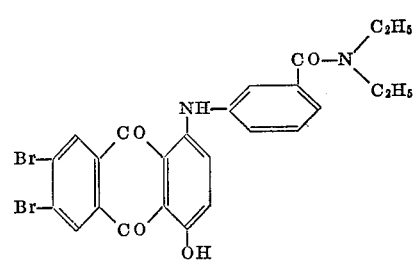

respectively is obtained. Both compounds have similar dyeing properties.

Example 62

A mixture of 32 parts of quinizarin and 16 parts of leucoquinizarin is heated for 6 hours at 100–110° with 66 parts of p-aminobenzoic acid dimethylamide and 30 parts of ortho boric acid in 200 parts of butanol. The mixture is then diluted with 300 parts of ethanol and 1 part of sodium perborate is added. After cooling, the precipitated reaction product is filtered off, washed with ethanol, stirred with 2000 parts in 1 N sodium hydroxide solution, again filtered off and washed with water. After recrystallisation from pyridine, the dyestuff of the formula

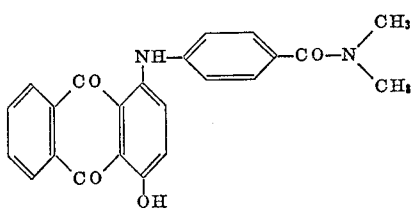

is obtained in the form of beautiful crystals which melt at 218–220°. The crystals dissolve in organic solvents with a violet and in concentrated sulphuric acid with a blue colour.

The dyestuff dyes polyglycol terephthalate fibres from an aqueous dispersion in violet shades which are fast to sublimation.

Example 63

36 parts of quinizarin and 12 parts of leucoquinizarin are heated for 4 hours at 60–65° with 40 parts of m-aminobenzoic acid-β-hydroxyethylamide, 30 parts of ortho boric acid and 100 parts of ethanol. After an intermediate formation of a solution, the condensation product precipitates in crystalline form. It is filtered off at 60° and washed with ethanol. On extracting the crude product with acetone, the violet dyestuff of the formula

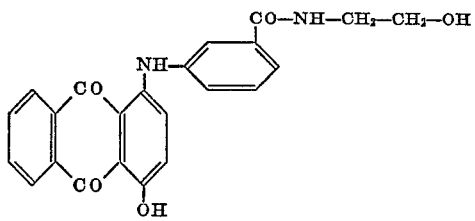

is separated from a little difficultly soluble dicondensation product which has also been formed.

The dyestuff dyes polyglycol terephthalate fibres as well as other polyester fibres from an aqueous dispersion in pure violet shades which are fast to sublimation.

Example 64

18 parts of quinizarin and 6 parts of leucoquinizarin are refluxed with 27 parts of m-aminobenzoic acid and 15 parts of ortho boric acid in 200 parts of ethanol. The condensation product is filtered off hot and recrystallised from pyridine. It corresponds to the formula

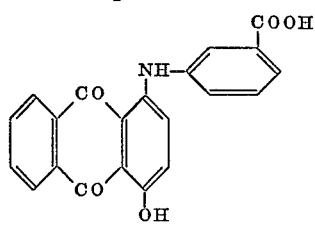

150 parts of thionyl chloride are poured over 36 parts of this carboxylic acid and stirred 24 hours at room temperature whereupon hydrochloric acid is developed and the carboxylic acid is converted into the acid chloride. Excess thionyl chloride is filtered off therefrom and the residue is washed with ether.

19 parts of the acid chloride so obtained are added at 25–30° to 110 parts of a 41% aqueous dimethylamine solution whereupon the acid chloride is dissolved. On acidifying this blue solution, the reaction product of the formula

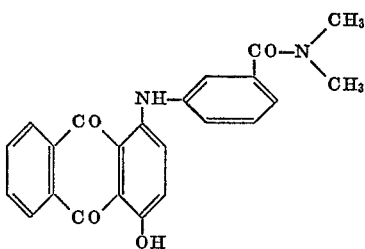

precipitates. After recrystallisation from butanol, the dyestuff is obtained in a pure form, M.P. 165–168°. It is identical with the dyestuff obtained according to Example 60.

Example 65

2 parts of the dyestuff obtained according to Example 60 are finely milled and dispersed in 4000 parts of water with the aid of 4 parts of lignin sulphonate and 4 parts of the sodium salt of dinaphthyl methane sulphonic acid. 12 parts of the sodium salt of o-phenylphenol and 12 parts of diammonium phosphate are added to this dispersion and 100 parts of a polyglycol terephthalate fabric are dyed therein for 1½ hours at 95–98°. The dyeing is rinsed and thoroughly washed with very dilute sodium hydroxide solution which contains dodecyl alcohol polyglycol ether as dispersing agent. A violet dyeing which is excellently fast to sublimation is obtained.

By using instead of 2 parts of the above dyestuff, a mixture of one part each of the two dyestuffs of the formulas

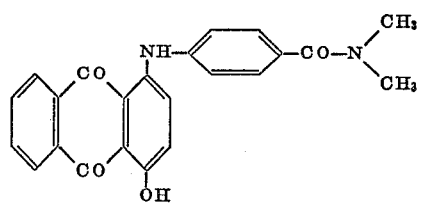

and

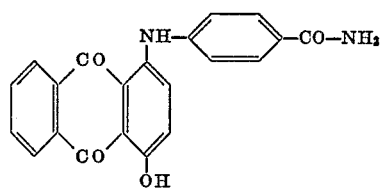

then with the same procedure as described in the example, a similar violet dyeing is obtained which is also fast to sublimation.

Example 66

A mixture of one part each of the two dyestuffs of the formulas

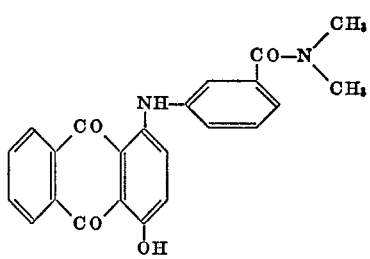

and

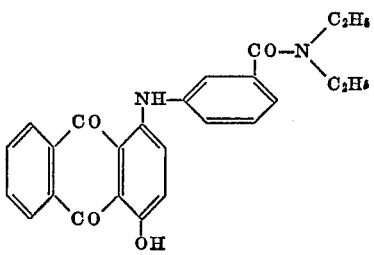

is suspended in 4000 parts of water with the aid of 4 parts of the sodium salt of dinaphthyl methane sulphonic acid. The pH of the dyestuff is adjusted to 6.5 with acetic acid. 100 parts of polyglycol terephthalate fabric are then introduced at 40°, the bath is heated with 15 minutes to 140° in an autoclave and kept for 45 minutes at this temperature. The dyeing is rinsed with water and soaped. In this way a pure violet dyeing is obtained which has excellent fastness to sublimation.

Example 67

A mixture of 5 parts each of the two dyestuffs of the formulae

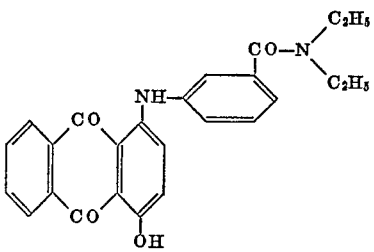

and

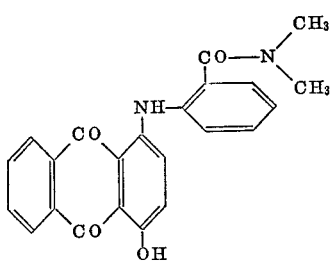

are finely milled in an aqueous suspension with 10 parts of lignin sulphonate and 10 parts of the sodium salt of dinaphthyl methane sulphonic acid. To this dispersion, 200 parts of an aqueous 2.5% sodium alginate solution, 10 parts of the condensation product of 1 mol of coconut oil fatty acids and 2 mols of diethanolamine, 20 parts of triethanolamine and 300 parts of water are added and the whole is stirred at 60° until it is a homogeneous mixture which is finally diluted with water up to 1000 parts.

A polyglycol terephthalate fabric is impregnated with this pad liquor, squeezed out to a liquor content of about 50%, dried and then the dyeing is thermofixed for 30 seconds at a temperature of 200°.

The dyed fabric is then treated for 15 minutes in a bath which contains per litre 1 g. of sodium carbonate and 1 g. of the condensation product of 1 mol of coconut oil fatty acids and 2 mols of diethanolamine at a temperature of 85°. Finally the goods are rinsed and dried.

A reddish violet dyeing is obtained which has excellent sublimation and wet fastness properties.

We claim:

1. A dyestuff mixture consisting essentially of, for any 4 molar portions of the mixture from 1 to 3 molar portions of a first dyestuff, and the balance of a second dyestuff, said first dyestuff falling under the formula

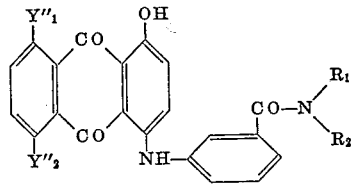

wherein one of Y″$_1$ and Y″$_2$ is a member selected from the group consisting of amino, lower alkylamino and hydroxy-lower alkylamino, and the other is the hydroxyl group, R$_1$ is a member selected from the group consisting of hydrogen, lower alkyl, lower alkenyl and hydroxy-lower alkyl, R$_2$ is a member selected from the group consisting of lower alkyl, lower alkenyl and hydroxy-lower alkyl, and R$_1$ and R$_2$ taken together with the nitrogen atom to which they are linked is a member selected from the group consisting of pyrrolidyl, piperidyl and morpholyl, and said second dyestuff falling under the formula

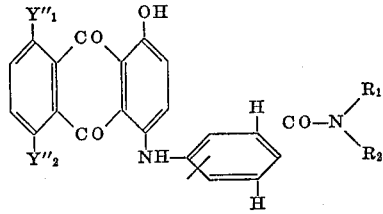

wherein Y″$_1$, Y″$_2$, R$_1$ and R$_2$ have the above indicated meanings.

2. A dyestuff mixture consisting essentially of, for any 4 molar portions of the mixture from 1 to 3 molar portions of a first dyestuff, and the balance of a second dyestuff, said first dyestuff falling under the formula

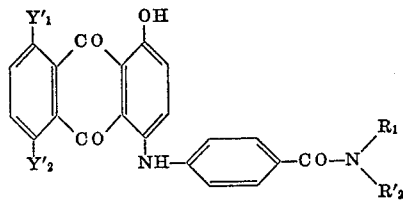

wherein one of Y′$_1$ and Y′$_2$ is nitro, and the other is the hydroxyl group,

R$_1$ is a member selected from the group consisting of lower alkyl, lower alkenyl, and hydroxy-lower alkyl.

R′$_2$ is a member selected from the group consisting of alkyl of from 2 to 4 carbon atoms, lower alkenyl and R$_1$ and R′$_2$ taken together with the nitrogen atom to which they are linked is a member selected from the group consisting of pyrrolidyl, piperidyl and morpholyl, and said second dyestuff falling under the formula

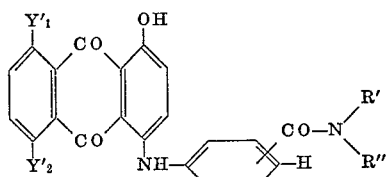

wherein Y′$_1$ and Y′$_2$ have the above meaning,

R′ is a member selected from the group consisting of lower alkyl, lower alkenyl, and hydroxy-lower alkyl, R″ is a member selected from the group consisting of lower alkyl, lower alkenyl and hydroxy-lower alkyl, and R′ and R″ taken together with the nitrogen atom to which they are linked is a member selected from the group consisting of pyrrolidyl, piperidyl and morpholyl.

3. A dyestuff mixture consisting essentially of, for any 4 molar portions of the mixture, from 1 to 3 molar portions of dyestuff of the formula

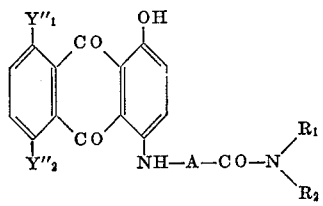

wherein one of Y″$_1$ and Y″$_2$ is a member selected from the group consisting of amino, lower alkylamino and hydroxy-lower alkylamino, and the other is the hydroxyl group, A is phenylene, R$_1$ is a member selected from the group consisting of lower alkyl, lower alkenyl and hydroxy-lower alkyl, R$_2$ is a member selected from the group consisting of lower alkyl, lower alkenyl and hydroxy-lower alkyl, and R$_1$ and R$_2$ taken together with the nitrogen atom to which they are linked is a member selected from the group consisting of pyrrolidyl, piperidyl and morpholyl, and the balance of the mixture consisting essentially of dyestuff of the formula

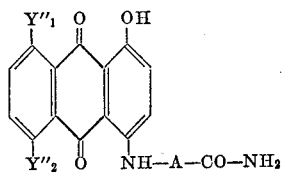

wherein one of Y″$_1$ and Y″$_2$ is a member selected from the group consisting of amino, lower alkylamino and hydroxy-lower alkylamino and the other is the hydroxyl group and A is phenylene.

4. A dyestuff mixture consisting essentially of, for any 4 molar portions of the mixture, from 1 to 3 molar portions of a first dyestuff selected from the group consisting of dyestuff of the formula

[Structure: anthraquinone with $Y'_1$, $Y'_2$, OH, and NH—phenyl—CO—N($R_1$)($R_2$)/H substituents]

wherein one of $Y'_1$ and $Y'_2$ is nitro and the other is hydroxyl, $R_1$ is a member selected from the group consisting of lower alkyl, lower alkenyl, and hydroxy-lower alkyl, $R_2$ is a member selected from the group consisting of lower alkyl, lower alkenyl and hydroxy-lower alkyl, and $R_1$ and $R_2$ taken together with the nitrogen atom to which they are linked is a member selected from the group consisting of pyrrolidyl, piperidyl and morpholyl, and a dyestuff of the formula

[Structure: anthraquinone with $Y'_1$, $Y'_2$, OH, and NH—phenyl—CO—N($R_1$)($R'_2$) substituents]

wherein $Y'_1$, $Y'_2$ and $R_1$ have the meaning given above, $R'_2$ is a member selected from the group consisting of alkyl of from 2 to 4 carbon atoms, lower alkenyl and hydroxy-lower alkyl, and $R_1$ and $R'_2$ taken together with the nitrogen atom to which they are linked is a member selected from the group consisting of pyrrolidyl, piperidyl and morpholyl, and the balance of the mixture consisting essentially of a dyestuff of the formula

[Structure: anthraquinone with $Y'_1$, $Y'_2$, OH, and NH—A—CO—NH$_2$ substituents]

wherein one of $Y'_1$ and $Y'_2$ is nitro, and the other is the hydroxyl group, and A is phenylene.

5. A mixture of the dyestuffs of the formulas

[Structure: anthraquinone with $NO_2$, OH, OH, and NH—phenyl—CO—N(CH$_3$)(CH$_3$) substituents]

and

[Structure: anthraquinone with $NO_2$, OH, OH, and NH—phenyl—CO—NH$_2$ substituents]

in a molar ratio ranging from about 3:1 to 1:3.

6. A mixed anthraquinone dyestuff which consists of a dyestuff of the formula

[Structure (I): anthraquinone with $Y_1$, OH, $Y_2$, and NH—phenyl—CONH$_2$ substituents]

wherein one of $Y_1$ and $Y_2$ is the hydroxyl group, the other is the nitro group, and from one to two dyestuffs of formula

[Structure (II): anthraquinone with $Y_1$, OH, $Y_2$, and NH—phenyl with $X_1$, $X_2$ substituents]

wherein one of $X_1$ and $X_2$ is hydroyen, the other is the CONH$_2$— group, and $Y_1$ and $Y_2$ have the meanings given in Formula I, the molar ratio of dyestuff of Formula I to dyestuff of Formula II ranging from about 1:9 to 9:1.

7. A mixed anthraquinone dyestuff as described in claim 6 wherein the molar ratio of dyestuff of Formula I to dyestuff of Formula II ranges from about 1:3 to 3:1.

8. A dyestuff mixture consisting essentially of a first dyestuff of the formula

[Structure: anthraquinone with $NO_2$, OH, OH, and NH—phenyl—CONH$_2$ substituents]

and a second dyestuff of the formula

[Structure: anthraquinone with $NO_2$, OH, OH, and NH—phenyl—CONH$_2$ substituents (para)]

the molar ratio of said first to said second dyestuff ranging from about 1:3 to 3:1.

9. A dyestuff mixture consisting essentially of a first, second and third dyestuff, each of which falls under the formula

[Structure: anthraquinone with $NO_2$, OH, OH, and NH—phenyl—CO—NH$_2$ substituents]

having the substituent —CO—NH$_2$ in m-, p- and o-position, respectively, to the —NH— bridge, the molar ratio of the first to the second dyestuff ranging from about 3:1 to 1:3 and the third dyestuff being present in about the same amount as said first dyestuff.

10. A mixture of the dyestuffs of the formulas

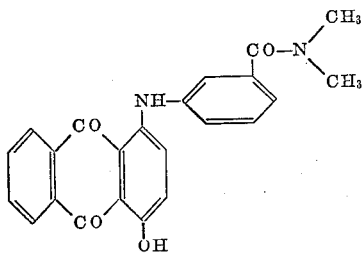

and

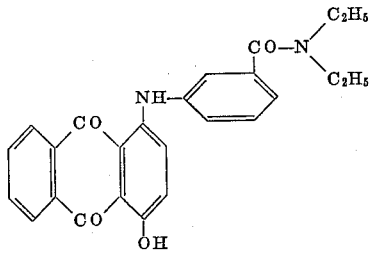

in a molar ratio ranging from about 1:3 to 3:1.

References Cited

UNITED STATES PATENTS 3,270,013  8/1966  Hindermann et al. __ 260—374 X

FOREIGN PATENTS 749,114  5/1950  Great Britain.

NORMAN G. TORCHIN, *Primary Examiner.*

J. T. TRAVIS, *Examiner.*

T. J. HERBERT, JR., *Assistant Examiner.*